US010242381B1

(12) United States Patent
Zappella et al.

(10) Patent No.: US 10,242,381 B1
(45) Date of Patent: Mar. 26, 2019

(54) OPTIMIZED SELECTION AND DELIVERY OF CONTENT

(71) Applicant: Amazon Technologies, Inc., Seattle, WA (US)

(72) Inventors: Giovanni Zappella, Berlin (DE); Cedric Philippe Charles Jean Ghislain Archambeau, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 945 days.

(21) Appl. No.: 14/661,996

(22) Filed: Mar. 18, 2015

(51) Int. Cl.
G06Q 30/00 (2012.01)
G06Q 30/02 (2012.01)
H04L 12/58 (2006.01)
G06F 17/30 (2006.01)
G05B 19/418 (2006.01)

(52) U.S. Cl.
CPC ..... *G06Q 30/0243* (2013.01); *G06F 17/3053* (2013.01); *G06Q 30/0245* (2013.01); *H04L 51/04* (2013.01)

(58) Field of Classification Search
None
See application file for complete search history.

(56) References Cited

U.S. PATENT DOCUMENTS

| 7,707,131 | B2 | 4/2010 | Chickering et al. | |
| 8,935,621 | B1 | 1/2015 | Lounsbury et al. | |
| 2003/0088458 | A1* | 5/2003 | Afeyan | G06F 17/50 706/13 |
| 2011/0196733 | A1* | 8/2011 | Li | G06Q 30/02 705/14.42 |
| 2013/0290110 | A1* | 10/2013 | LuVogt | G06Q 30/02 705/14.66 |
| 2015/0332372 | A1* | 11/2015 | Hariri | G06F 17/30867 705/26.7 |

OTHER PUBLICATIONS

"Search based Video Recommendations". ISBN (electronic): 978-1-4799-1588-0. Electronic publication date: Mar. 19, 2014. 2013 Fourth National Conference on Computer Vision, Pattern Recognition . . . (Year: 2014)*
Agrawal, S. "Analysis of Thompson Sampling for the Multi-armed Bandit Problem", published by Microsoft, copyright 2012, [online][retrieved on Mar. 18, 2015] retrieved from: http://jmlr.csail.mit.edu/proceedings/papers/v23/agrawal12/agrawal12.pdf , 26 pps.
Web article: Thompson sampling, published by Wikipedia [online][retrieved on Mar. 18, 2015] retrieved from: http://en.wikipedia.org/wiki/Thompson_sampling, 4 pps.

* cited by examiner

*Primary Examiner* — Maria V Vanderhorst
(74) *Attorney, Agent, or Firm* — Lee & Hayes, P.C.

(57) ABSTRACT

Technologies for optimized selection of content for delivery to a user that both optimizes the expected return from the delivery of the content to the user and that enables exploration of delivery of new content to users are disclosed. Content is selected for delivery to a user based on an exploitation score that defines an estimate of the feedback expected from the delivery of the content to the user and an exploration score that varies inversely with the number of times that the content has been transmitted to all users. The use of the exploration score enables the exploration of delivery of new content to users. The content might be delivered via e-mail messages, a web site, or using another mechanism.

20 Claims, 5 Drawing Sheets

OPTIMIZED SELECTION AND DELIVERY OF CONTENT

BACKGROUND

In large organizations it is not unusual for many different operating units to have an interest in sending electronic content to customers or potential customers. For example, the operator of an e-commerce web site or other type or retail business might have many different operating units that would like to send electronic mail ("email") messages to customers or potential customers of the e-commerce web site. Each operating unit might, for instance, desire to send content to customers or potential customers advertising certain products or services of interest to a customer or potential customer.

Customers or potential customers of an organization, such as the e-commerce web site described above, typically do not want to receive a large volume of email or other types of messages from a single organization. As a result, an organization might limit the number of messages that are sent to each customer during a particular time period. For example, a limit of one email message per day per customer might be imposed across all of the various operating units within an organization. When such a restriction is imposed, however, it might be difficult to select the content that should be sent to each customer in the messages in order to maximize the potential return from the transmission of the messages while at the same time exploring the effectiveness of new content.

It is with respect to these and other considerations that the disclosure made herein is presented.

DETAILED DESCRIPTION

Figure 1:
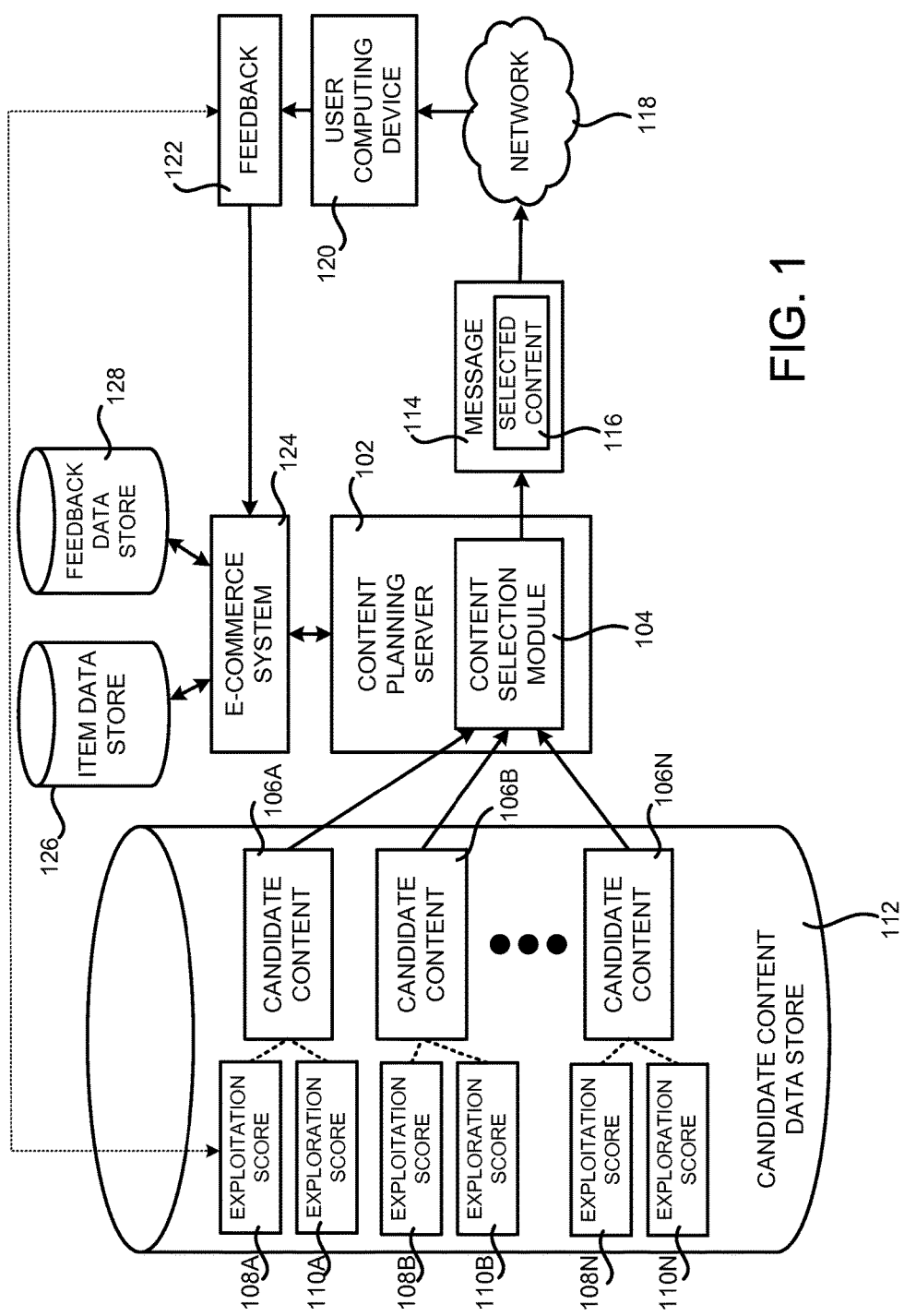
FIG. 1 is a system diagram illustrating various aspects of a mechanism disclosed herein for optimizing the selection of content for delivery to users in one particular configuration.

The following detailed description is directed to technologies for optimized selection and delivery of content. Through an implementation of the concepts and technologies disclosed herein, content can be selected for delivery to a customer or potential customer (which may be referred to herein simply as a "user") in a manner that both optimizes the expected return from the transmission of the content, and that also permits exploration of the expected return of new content that has not been previously transmitted to users or that has only been transmitted to users a relatively small number of times.

In one particular configuration, a content selection module is provided that implements computer learning methods in order to identify content for transmission to users, such as in email messages or other types of electronic messages, that is likely to result in a desired user action, such as making a purchase or visiting an e-commerce web site. In selecting content for transmission to a user, it is generally desirable to present the most effective content to the user. The effectiveness of a particular instance of content can be a measure of whether a desired result is obtained from the user and/or whether a desired action is performed by the user. The desired action or result can be any action or result that may be desired from a user once the user has viewed the content. For example, and without limitation, a desired action may be the user selecting a portion of the content, or the user eventually purchasing an item referenced by an instance of content through a hyperlink or in another manner.

Selecting an instance of content for transmission to a user from a number of available instance of content might be thought of as variation of the multi-armed bandit problem. In statistics, a "multi-armed bandit" problem (referencing the "one-armed bandit" term that is commonly used for a slot machine) consists of determining which one of multiple "arms" or levers to select in each of a series of trials, where each lever provides a reward drawn from a distribution associated with that specific lever. The objective is generally to maximize the total reward earned through a sequence of pulls of the levers. Generally, no initial knowledge about the levers is available prior to the first trial. While various strategies have been developed to provide approximate solutions to versions of the multi-armed bandit problem, these solutions often have limited applicability to specific real world circumstances due to their reliance on certain constraints or assumptions regarding the underlying problem.

If a given content selection problem involves selecting an instance of content from among a set of instances of content (e.g. selecting one instance of content from a number of instances of content created by different operating units in an organization) for transmission to a user, such as a customer or potential customer, each instance of content available for transmission might be thought of as an "arm" in a multi-armed bandit problem. Selecting a particular instance of content for transmission to a user, therefore, may be thought of as "pulling" that arm. However, this content selection problem may differ from the traditional multi-armed bandit problem in various ways, such that known approximate solutions to the traditional multi-armed bandit problem may not be well suited to the content selection problem.

For example, content selection, depending on the specific instance or scenario, may differ from the traditional multi-armed bandit problem because feedback indicating whether a particular instance of content was successful in a given trial may not be immediately known. For example, an email message containing the selected content may be transmitted to a user. It may, however, be 12 or more hours before the user views the email message and takes action on the content of the message, such as selecting a hyperlink in the message or requesting to unsubscribe from any future messages. Additional aspects of the content selection problem are discussed in more detail below, along with approaches to solving the various unique aspects of this problem.

In order to address these considerations, and potentially others, a content selection module is provided in one particular configuration. The content selection module is configured to select instances of content for transmission to users, such as customers or potential customers of an e-commerce web site. The selected content might then be transmitted to users through various mechanisms such as, but not limited to, email messages, short messaging system ("SMS") messages, instant messages, push notifications, and/or other types of electronic messaging systems. The selected content might also be provided in a web page or another type of content page. The selected content might also be provided to users in other ways in other configurations.

As described briefly above, the various instances of content might be authored by different operating units within an organization. For example, one operating unit might desire to send content to customers or potential customers advertising one product or service, while another operating unit desires to send content regarding another product or service. As also discussed above, various constraints might also be placed on the number of messages transmitted to a user in a particular time period, such as one message per day. In this scenario, two or more instances of candidate content might first be identified for a user based upon various attributes or context associated with the user. For example, the instances of candidate content might be identified based upon the user's age, hobbies, previous purchase history, geographic location, and/or other attributes.

In order to select one of the instances of candidate content for transmission to a user, an exploitation score might be computed for each of the instances of candidate content. The exploitation score defines an estimate of the feedback expected from the user following the delivery of the instance of content to the user. The exploitation score may be computed based upon historical feedback received following transmission of an instance of content to one or more users. For example, and without limitation, the exploitation score might indicate the percentage of users to which the content has been previously transmitted that subsequently made a purchase or took another desired action.

An exploration score might also be computed for each of the instances of candidate content. The exploration score is computed by a function in one particular configuration that varies inversely to the number of times that an instance of content has been transmitted to users. In this way, the exploration score will be very high when the instance of candidate content has not yet been transmitted to users or has only been transmitted to users a relatively low number of times. The exploration score will decrease to zero as the instance of candidate content is transmitted to a larger number of users. In this way, a ranking score associated with each instance of candidate content can be artificially inflated while the effectiveness of the content is explored.

In one configuration, a ranking score is also computed for each of the instances of candidate content. For example, and without limitation, the ranking score might be computed by summing the exploitation score and the exploration score for a particular instance of candidate content. Other types of mathematical operations might be utilized on the exploitation score and the exploration score in order to compute the ranking score for a particular instance of candidate content. The instances of candidate content might then be ranked based upon their associated ranking scores.

Once the instances of candidate content for a user have been ranked, one of the instances of candidate content may be selected for transmission to a user. For example, and without limitation, the highest ranked instance of candidate content might be selected for transmission to a user. Other mechanisms might also be utilized to select a particular instance of candidate content for transmission to a user from the ranked instances of candidate content. The selected instance of candidate content may then be transmitted to the user utilizing one or more of the mechanisms described above.

Following transmission of the content to the user, feedback may be obtained from the user based upon the content transmitted to the user. For example, and without limitation, positive feedback might be considered to have been received from the user if the user makes a purchase based on the content. Negative feedback might also be received from the user. For example, and without limitation, the user might request to unsubscribe from any further content. In either case, the exploitation score may be updated based upon the obtained feedback in some configurations. If the obtained feedback is negative, the exploitation score might be penalized dynamically based on one or more attributes. For example, and without limitation, the exploitation score might be penalized in an amount that varies based upon the volume of purchases previously made by the user. Other attributes might also be utilized to dynamically penalize the exploitation score.

In another configuration, instances of candidate content are selected for transmission to a user based upon a distribution over the possible values of the exploitation score for the instances of candidate content. In this configuration, a distribution over the possible values of the exploitation score is computed for each of the instances of candidate content. Sampling is performed over the distributions in order to obtain a ranking score for the instances of candidate content. The ranking scores are then ranked and utilize to select one or more instances of candidate content for transmission to a user in the manner described above. Feedback obtained from a user following transmission of an instance of candidate content to the user can then be utilized to update the distribution over the possible values of the exploitation score.

It should be appreciated that the technologies presented herein are primarily described in terms of a configuration in which the effectiveness of a given instance of content is determined based on the likelihood of a user purchasing an item after the user is shown the content. However, any metric could be used to measure effectiveness or success rate of an instance of content (i.e. the exploitation score), and the technologies disclosed herein could consider data other than units or volume purchased, such as the number of times a user selected an item or other content, the total amount of money spent by the user after viewing an instance of content, the number of clicks made by a user, a user signing up or registering with a web site or other type of service, or another metric. Additional details regarding these and other aspects of the various technologies disclosed herein will be provided below with regard to FIGS. 1-4.

It should be appreciated that the configurations disclosed herein might be utilized with any type of computer, computing system, device, merchant or e-commerce site, application program, operating system, or other type of system or component. It should also be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The technologies described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures.

FIG. 1 is a system diagram illustrating various aspects of a mechanism disclosed herein for optimizing the selection of content for delivery to users in one particular configuration. In the illustrated configuration, a content planning server 102 is provided for selecting content to be transmitted to users. The content planning server 102 may include a content selection module 104 for selecting content to be transmitted to users, such as in email messages. The illustrated environment also includes an e-commerce system 124 that facilitates electronic browsing and/or purchasing of goods and services using various user devices, such as a user computing device 120. Those skilled in the art will recognize that the user computing device 120 may be one of any number of computing devices that are capable of communicating over a network including, but not limited to, a laptop, personal computer, personal digital assistant (PDA), table or slate computing device, smartphone, feature phone, electronic book reader, digital media player, and the like.

The e-commerce system 124 may be connected to or in communication with an item data store 126 that stores information associated with items available for browse and/or purchase. Item data stored in the item data store 126 may include any information related to an item, such as an item available for purchase, that may be of interest to a user or may be useful for classifying or recommending an item. For example, item data may include, but is not limited to, price, availability, title, item identifier, item feedback (e.g., user reviews, ratings, etc.), item image, item description, item attributes, etc. While the item data store 126 is depicted in FIG. 1 as being local to e-commerce system 124, those skilled in the art will appreciate that the item data store 126 may be remote to the e-commerce system 124, and/or may be a network-based service itself.

The content planning server 102 may be connected to or in communication with a feedback data store 128. The feedback data store 128 may store information regarding purchases and/or other types of actions taken by a user following provision of content to a user. For example, and without limitation, the feedback data store 128 might store information associated with completed purchases, such as information identifying the items included in an order, a session identifier, information identifying the user or customer, shipping information, etc. The feedback data store 128 might also store information associated with users' browsing or viewing activities, such as information regarding the pages or files that a user viewed and the content selected by a user in a given session.

The content planning server 102 may additionally be connected to or in communication with a candidate content data store 112 that stores information associated with candidate content. For example, and without limitation, the candidate content data store 112 might store instances of candidate content 106A-106N. As discussed above, the instances of candidate content 106A-106N might be content that is suitable for transmission in email messages or other types of electronic communications. The instances of candidate content 106A-106N might include different content advertising different products or services that is created by different operating units within an organization, for example. As will be described in greater detail below, exploitation scores 108A-108N and exploration scores 110A-110N might be computed for each of the instances of candidate content 106A-106N, respectively, and utilized to select one of the instances of candidate content 106A-106N for transmission to a particular user.

It should be appreciated that the configuration of data stores shown in FIG. 1 is illustrative and that other configurations might be utilized. For example, and without limitation, the candidate content data store 112, the item data store 126 and the feedback data store 128 might be local or remote to the content planning server 102, might be local or remote to the e-commerce system 124, and/or may be network-based services themselves.

In the environment shown in FIG. 1, the user computing device 120 may communicate with the e-commerce system 124 via a communication network 118, such as the Internet or other communications link. Those skilled in the art will appreciate that the network 118 may be any wired network, wireless network or combination thereof. In addition, the network 118 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

The system depicted in FIG. 1 operates in a distributed computer environment comprising several computer systems that are interconnected using one or more computer networks. However, it will be appreciated by those skilled in the art that the disclosed system could equally operate within a computer system having a fewer or greater number of components than are illustrated in FIG. 1. Thus, the depiction of system in FIG. 1 should be taken as illustrative and not limiting to the present disclosure. For example, the system could implement various web services components and/or peer-to-peer network configurations to implement at least a portion of the processes.

In brief, the e-commerce system 124 is generally responsible for providing front-end communication with various user devices, such as user computing device 120, via network 108. The front-end communication provided by the e-commerce system 124 may include generating text and/or graphics, possibly organized as a user interface using hypertext transfer ("HTTP") or other protocols in response to information inquiries received from the various user devices.

The e-commerce system 124 may obtain information on available goods and services (which might be referred to herein as "items") from item data store 126, as is done in conventional electronic commerce systems. In one configuration, the item data store 126 includes information on items available from a plurality of sellers (as opposed to storing information for only a single vendor). In certain configurations, the e-commerce system 124 may also access item data from other data sources, either internal or external to the e-commerce system 124. Accordingly, the e-commerce system 124 may obtain item information for items offered for sale by a plurality of sellers. A user may then purchase items from a plurality of sellers in a single transaction or order placed with the e-commerce system 124. In other configurations, the user may purchase items from a single vendor in a single transaction or order placed with the e-commerce system 124.

As described below in reference to FIG. 4, the content planning server 102 may include a processing unit, a memory unit, an optional display, and a network interface, all of which may communicate with one another by way of a communication bus. The e-commerce system 124 may be similarly arranged. A network interface included in the content planning server 102 is preferably connected to one or more computer networks that connect to other components. A processing unit may thus receive information and instructions from other computing components, such as the e-commerce system 124, item data store 126, and/or the feedback data store 128 via the network interface.

As shown in FIG. 1, and described briefly above, the content planning server 102 is configured with a content selection module 104 in one particular configuration. The content selection module 104 is configured to select instances of content 106 for transmission to users, such as customers or potential customers of an e-commerce web site. The selected instance of content 106 might then be transmitted to users through various mechanisms such as, but not limited to, email messages, SMS messages, instant messages, and/or other types of electronic messaging systems. For example, and without limitation, in the example shown in FIG. 1, a message 114 with selected content 116 is transmitted to the user computing device 120 via the network 110. The selected content 116 might also be provided in a web page or another type of content page. The selected content 116 might also be provided to users in other ways in other configurations.

As also described briefly above, the various instances of content 106A-106N might be authored by different operating units within an organization. For example, one operating unit might desire to send an instance of content 106A to customers or potential customers advertising one product or service, while another operating unit desires to send an instance of content 106B regarding another product or service. As additionally discussed above, various constraints might also be placed on the number of messages transmitted to a user in a particular time period, such as one message per day. In this scenario, two or more instances of candidate content 106 might first be identified for a particular user based upon various attributes or context associated with the user. For example, the candidate instances of content 106 for the particular user might be identified based upon the user's age, hobbies, previous purchase history, geographic location, and/or other attributes.

In order to select one of the instances of candidate content 106 for transmission to a particular user, an exploitation score 108 might be computed for each of the instances of candidate content 106. The exploitation score 108 for an instance of candidate content 106 defines an estimate of the feedback expected from the user following the delivery of the instance of content 106 to the user. The exploitation score 108 might be computed based upon historical feedback received following transmission of an instance of content 106 to one or more users. For example, and without limitation, the exploitation score 108 for a particular instance of content 106 might indicate the percentage of users to which the instance of content 106 has been previously transmitted that subsequently made a purchase or took another desired action based on the instance of candidate content 106.

An exploration score 110 might also be computed for each of the instances of candidate content 106. The exploration score 100 for a particular instance of candidate content 106 is computed by a function in one particular configuration that varies inversely to the number of times that the instance of content 106 has been transmitted to users. In this way, the exploration score 110 will be very high when the instance of candidate content 106 has not yet been transmitted to users or has only been transmitted to users a relatively low number of times. The exploration score 110 for an instance of candidate content 106 will decrease to zero as the content 106 is transmitted to a larger number of users. In this way, a ranking score associated with each instance of candidate content 106 can be artificially inflated while the effectiveness of the content 106 is explored.

In one configuration, a ranking score is also computed for each of the instances of candidate content 106. For example, and without limitation, the ranking score might be computed by summing the exploitation score 108 and the exploration score 110 for a particular instance of candidate content 106. Other types of mathematical operations might be utilized on the exploitation score 108 and the exploration score 110 in order to compute the ranking score for a particular instance of candidate content 106. The instances of candidate content 106 might then be ranked based upon their associated ranking scores.

Once the instances of candidate content 106 for a particular user have been ranked, one of the instances of candidate content 106 may be selected for transmission to a user. For example, and without limitation, the highest ranked instance of candidate content 106 might be selected for transmission to a user. Other mechanisms might also be utilized to select a particular instance of candidate content 106 for transmission to a user from the ranked instances of candidate content 106. The selected instance of candidate content 106 (i.e. the selected content 116 in FIG. 1) may then be transmitted to the user computing device 120 via the network 118 utilizing one or more of the mechanisms described above. Additional details regarding the selection of an instance of content 106 for transmission to a user will be provided below with regard to FIG. 2A.

It should be appreciated that, in some configurations, more than one instance of candidate content 106 might be selected for transmission to a user. For example, and without limitation, the top N instances of candidate content 106 might be selected from the ranked instances of candidate content. In another configuration, a function may be maximized over the N instances of candidate content 106 in the ranking. Other mechanisms might also be utilized to select multiple instances of candidate content 106 for transmission to a user.

Following transmission of the selected content 116 to the user, feedback 122 might be obtained from the user based upon the content transmitted to the user. For example, and without limitation, positive feedback 122 might be considered to have been received from the user if the user makes a purchase from the e-commerce system 124 based on the content. Negative feedback 122 might also be received from the user. For example, and without limitation, the user might request to unsubscribe from any further content from the content planning server 102 or might request that fewer messages be transmitted. In this regard, it should be appreciated that negative feedback might be explicit, such as in the case where the user requests to unsubscribe from any further content, or implicit, such as in the case where the user does not take the desired action (e.g. the user does not make a purchase or visit an e-commerce web site within some period of time following transmission of a message 114).

In either case, the exploitation score 108 for the content transmitted to the user is updated based upon the obtained feedback 122 in some configurations. If the obtained feedback 122 is negative, the exploitation score 108 for the transmitted content might be penalized dynamically based on one or more attributes. For example, and without limitation, the exploitation score 108 for the transmitted content might be penalized in an amount that varies based upon the volume of purchases previously made by the user. Other attributes might also be utilized to dynamically penalize the exploitation score. Additional details regarding the process of dynamically penalizing the exploitation scores 108 will be described below with regard to FIG. 3.

Figure 2A:
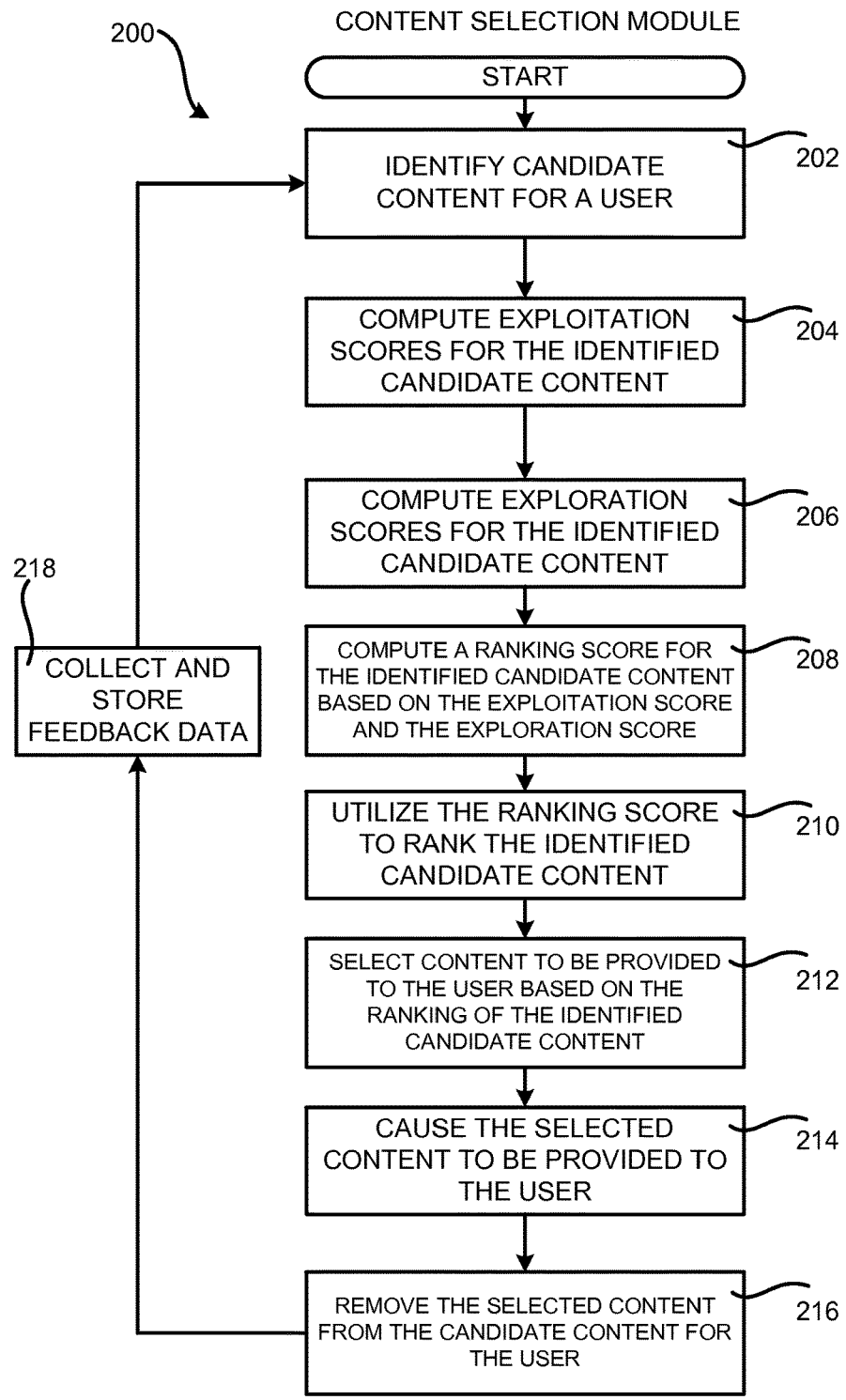
FIG. 2A is a flow diagram showing one illustrative routine that illustrates aspects of the operation of a content selection module disclosed herein in which content is selected for transmission to a user based upon an exploitation score and an exploration score.

Turning now to FIG. 2A, additional details will be provided regarding the operation of the content selection module 104 for selecting instances of content for transmission to users. In particular, FIG. 2A is a flow diagram showing one illustrative routine 200 that illustrates aspects of the operation of the content selection module 104 for selecting content 106 for delivery to users based on an exploitation score 108 and an exploration score 110.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGS. are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 200 begins at operation 202, where two or more instances of candidate content 106 are identified as candidates for transmission to a particular user based upon various attributes or context associated with the user. As discussed above, for example, the candidate instances of content 106 for the particular user might be identified based upon the user's age, hobbies, previous purchase history, geographic location, and/or other attributes.

From operation 202, the routine 200 proceeds to operation 204, where an exploitation score 108 is computed for each of the instances of candidate content 106 for the user. As discussed above, the exploitation score 108 for an instance of candidate content 106 defines an estimate of the feedback expected from the user following the delivery of the instance of content 106 to the user. The routine 200 then proceeds from operation 204 to operation 206.

At operation 206, an exploration score 110 is computed for each of the instances of candidate content 106. As also discussed above, the exploration score 100 for a particular instance of candidate content 106 is computed by a function in one particular configuration that varies inversely to the number of times that the instance of content 106 has been transmitted to users. Once the exploration scores 110 have been computed, the routine 200 proceeds from operation 206 to operation 208.

At operation 208, a ranking score computed for each of the instances of candidate content 106. For example, and without limitation, the ranking score might be computed by summing the exploitation score 108 and the exploration score 110 for a particular instance of candidate content 106. Other types of mathematical operations might be utilized on the exploitation score 108 and the exploration score 110 in order to compute the ranking score for a particular instance of candidate content 106. The instances of candidate content 106 are then ranked based upon their associated ranking scores at operation 210.

At operation 212, one or more of the instances of candidate content 106 may be selected for transmission to the user based upon the ranking performed at operation 210. For example, and without limitation, the highest ranked instance, or N instances, of candidate content 106 might be selected for transmission to a user. Other mechanisms might also be utilized to select one or more instances of candidate content 106 for transmission to a user from the ranked instances of candidate content 106. The selected instance, or instances, of candidate content 106 (i.e. the selected content 116 in FIG. 1) is then transmitted to the user computing device 120 via the network 118 utilizing one or more of the mechanisms described above at operation 214. At operation 216, the selected content 116 that was transmitted to the user at operation 214 may be removed from the set of candidate content 106. In this way, the same content 106 will not be transmitted to the user twice.

From operation 216, the routine 200 proceeds to operation 218, where feedback 122 may be received from the user and stored in the feedback data store 128. For example, and without limitation, positive feedback 122 might be considered to have been received from the user if the user makes a purchase from the e-commerce system 124 based on the content. Implicit or explicit negative feedback 122 might also be received from the user. For example, and without limitation, the user might request to unsubscribe from any further content from the content planning server 102.

In either case, the exploitation score 108 for the content transmitted to the user is updated based upon the obtained feedback 122 in some configurations. If the obtained feedback 122 is negative, the exploitation score 108 for the transmitted content might be penalized dynamically based on one or more attributes. For example, and without limitation, the exploitation score 108 for the transmitted content might be penalized in an amount that varies based upon the volume of purchases previously made by the user. Other attributes might also be utilized to dynamically penalize the exploitation score. Additional details regarding the process of dynamically penalizing the exploitation scores 108 will be described below with regard to FIG. 3. From operation 218, the routine 200 proceeds back to operation 202, where the process described above might be repeated, for instance after a certain period of time (e.g. 24 hours) has elapsed since the previous iteration of the routine 200.

Figure 2B:
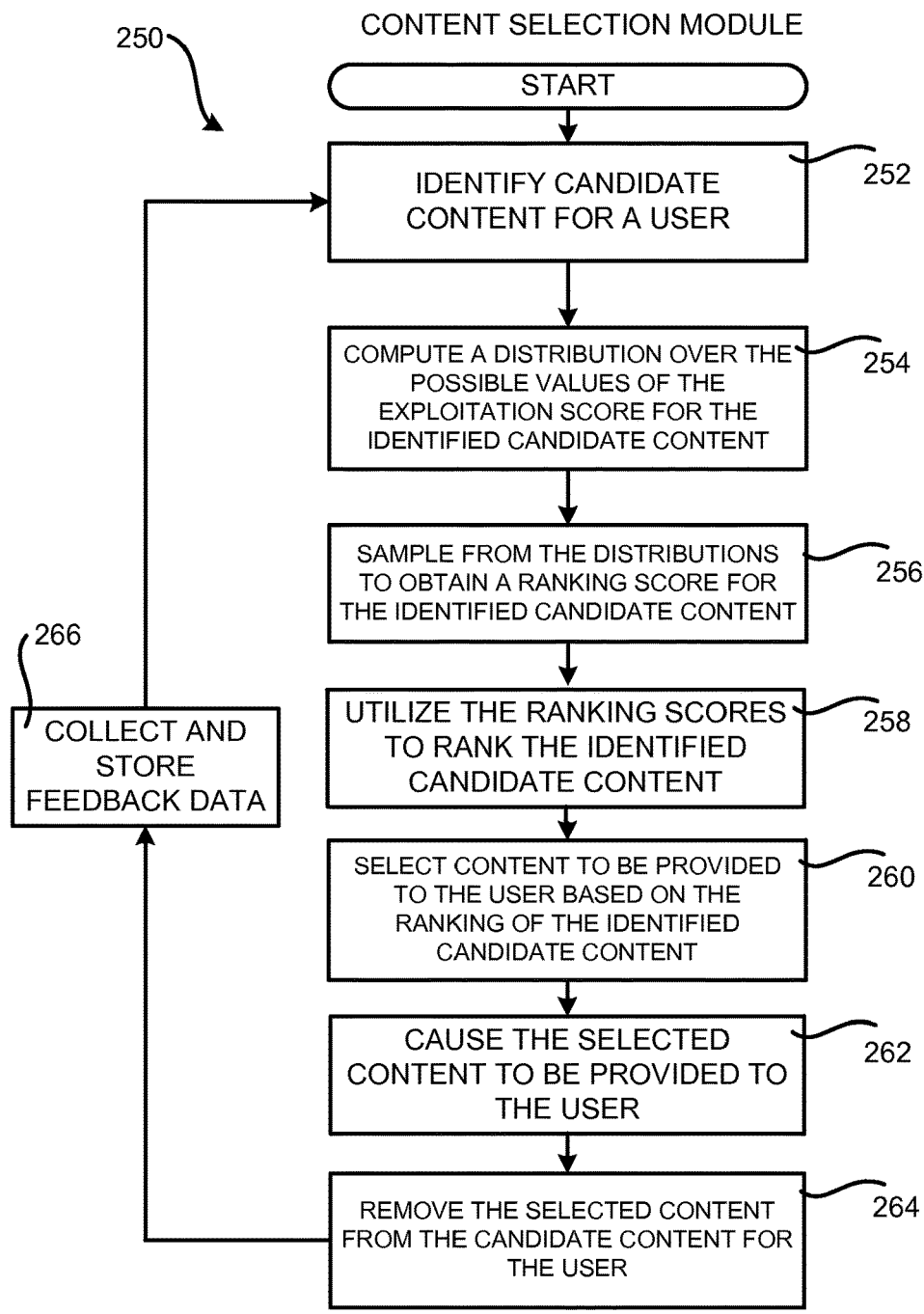
FIG. 2B is a flow diagram showing one illustrative routine that illustrates aspects of the operation of a content selection module disclosed herein in which content is selected for transmission to a user by sampling a distribution of possible values of an exploitation score.

FIG. 2B is a flow diagram showing a routine 250 that illustrates aspects of the operation of the content selection module 104 in which one or more instances of content 106 are selected for transmission to a user by sampling a distribution of possible values of the exploitation score 108. The routine 250 begins at operation 252, where two or more instances of candidate content 106 are identified as candidates for transmission to a particular user based upon various attributes or context associated with the user. As discussed above, for example, the candidate instances of content 106 for the particular user might be identified based upon the user's age, hobbies, previous purchase history, geographic location, and/or other attributes.

From operation 252, the routine 250 proceeds to operation 254, where the content selection module 104 computes a distribution over the possible values of the exploitation score for the instances of candidate content 106 identified at operation 252. The routine 250 then proceeds from operation 254 to operation 256, where the content selection module 104 samples from the distributions computed at operation 254 to obtain a ranking score for each of the instances of candidate content identified at operation 252. in one particular implementation, Thompson Sampling is utilized to sample from the distributions. Other sampling methodologies might also be utilized in other configurations.

The routine 250 then proceeds from operation 256 to operation 258, where the instances of candidate content 106 are ranked based upon their associated ranking scores. The routine 250 then proceeds to operation 260, where one or more of the instances of candidate content 106 may be selected for transmission to the user based upon the ranking performed at operation 258. For example, and without limitation, the highest ranked instance of candidate content 106 might be selected for transmission to a user. Other mechanisms might also be utilized to select one or more instances of candidate content 106 for transmission to a user from the ranked instances of candidate content 106. The selected instance of candidate content 106 (i.e. the selected content 116 in FIG. 1) is then transmitted to the user computing device 120 via the network 118 utilizing one or more of the mechanisms described above at operation 262. At operation 264, the selected content 116 that was transmitted to the user at operation 262 may be removed from the set of candidate content 106. In this way, the same content 106 will not be transmitted to the user twice.

From operation 264, the routine 200 proceeds to operation 266, where feedback 122 may be received from the user and stored in the feedback data store 128 as discussed above. The distribution over the possible values of the exploitation score 108 for the content transmitted to the user is then updated based upon the obtained feedback 122 in some configurations. From operation 266, the routine 200 proceeds back to operation 252, where the process described above might be repeated, for instance after a certain period of time (e.g. 24 hours) has elapsed since the previous iteration of the routine 250.

Figure 3:
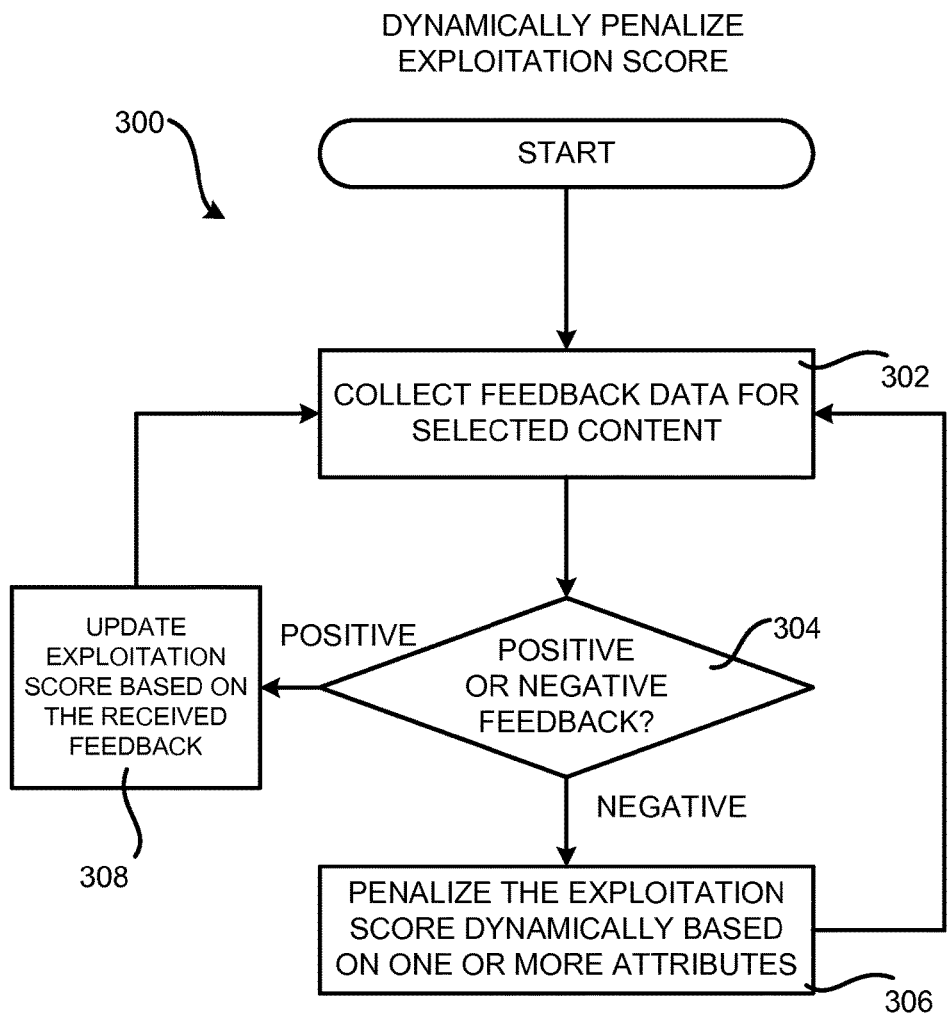
FIG. 3 is a flow diagram showing an illustrative routine that illustrates aspects of one mechanism for dynamically penalizing an exploitation score for content in response to receiving negative feedback for the content.

FIG. 3 is a flow diagram showing an illustrative routine 300 that illustrates aspects of one mechanism for dynamically penalizing an exploitation score 108 for content 106 in response to receiving negative feedback for the content 106. The routine 300 begins at operation 302, where feedback 122 is collected in the manner described above with regard to operation 218 of the routine 200. The routine 300 then proceeds from operation 302 to operation 304, where a determination is made as to whether the collected feedback 122 is positive or negative. If the feedback 122 is positive, the routine 300 proceeds from operation 304 to operation 308, where the exploitation score for the content 106 is updated in the manner described above.

If, however, the received feedback 122 is negative, the routine 300 proceeds from operation 304 to operation 306. At operation 306, the exploitation score 108 for the transmitted content is penalized dynamically based on one or more attributes. For example, and without limitation, the exploitation score 108 for the transmitted content might be penalized in an amount that varies based upon the volume of purchases previously made by the user. Other attributes might also be utilized to dynamically penalize the exploitation score. From operation 306, the routine 300 proceeds back to operation 302, where additional feedback 122 might be received and processed in the manner described above.

Figure 4:
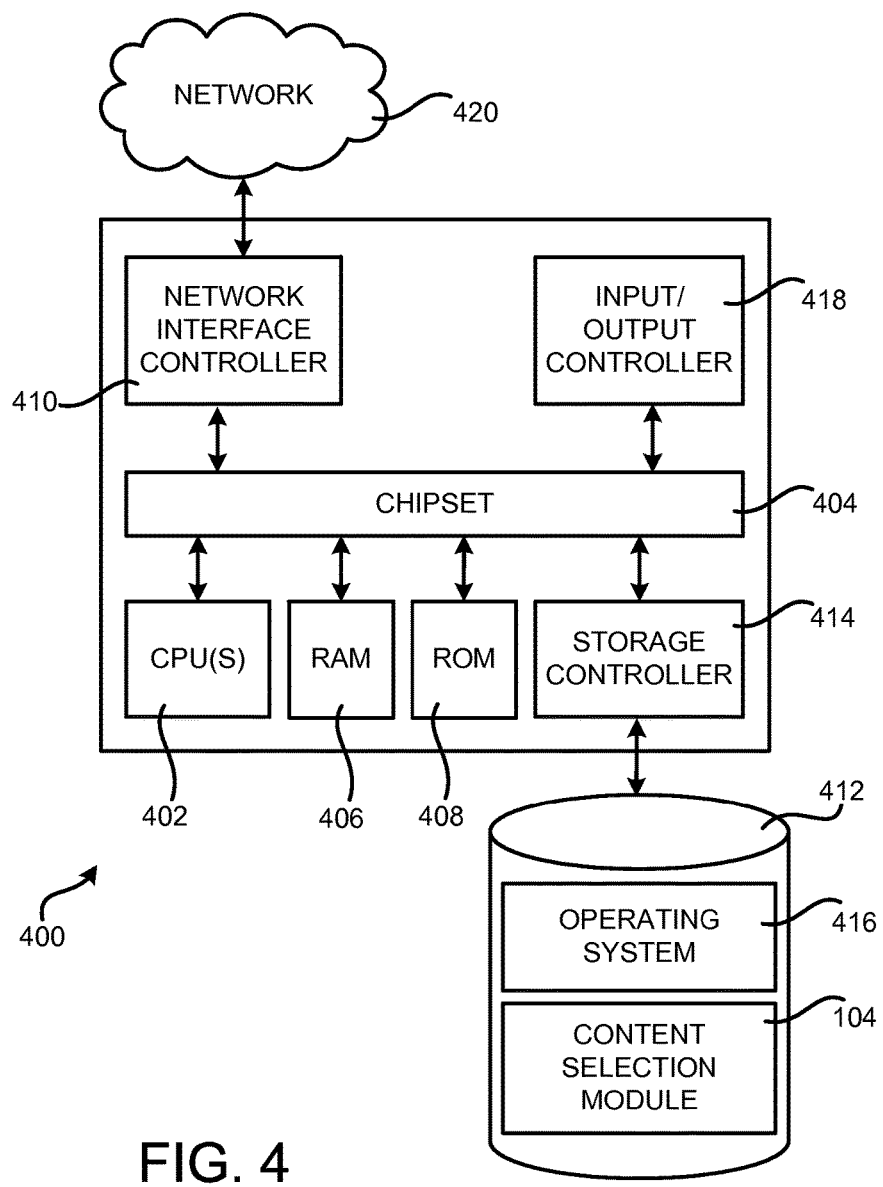
FIG. 4 is a computer architecture diagram showing one illustrative computer hardware architecture for use in computing devices configured to implement the concepts and technologies disclosed herein in one particular configuration.

FIG. 4 shows an example computer architecture for a computer 400 capable of executing the software components described herein for optimized selection of content for delivery to a user. The computer architecture shown in FIG. 4 illustrates a conventional server computer, workstation, desktop computer, laptop, electronic book reader, digital wireless phone, tablet computer, network appliance, set-top box, or other computing device. The computer architecture shown in FIG. 4 may be utilized to implement a computer that is capable of executing the various software components described above.

The computer 400 includes a baseboard, or "motherboard," which is a printed circuit board to which a multitude of components or devices may be connected by way of a system bus or other electrical communication paths. In one illustrative configuration, one or more central processing units ("CPUs") 402 operate in conjunction with a chipset 404. The CPUs 402 are standard programmable processors that perform arithmetic and logical operations necessary for the operation of the computer 400.

The CPUs 402 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 404 provides an interface between the CPUs 402 and the remainder of the components and devices on the baseboard. The chipset 404 may provide an interface to a random access memory ("RAM") 406, used as the main memory in the computer 400. The chipset 404 may further provide an interface to a computer-readable storage medium such as a read-only memory ("ROM") 408 or non-volatile RAM ("NVRAM") for storing basic routines that that help to startup the computer 400 and to transfer information between the various components and devices. The ROM 408 or NVRAM may also store other software components necessary for the operation of the computer 400 in accordance with the configurations described herein.

In one configuration, the computer 400 operates in a networked environment using logical connections to remote computing devices and computer systems through a network, such as a local-area network ("LAN"), a wide-area network ("WAN"), the Internet, or any other networking topology known in the art that connects the computer 400 to remote computers. The chipset 404 includes functionality for providing network connectivity through a network interface controller ("NIC") 410, such as a gigabit Ethernet adapter. It should be appreciated that multiple NICs 410 may be present in the computer 400, connecting the computer 400 to other types of networks and remote computer systems.

The computer 400 may be connected to a mass storage device 412 that provides non-volatile storage for the computer. The mass storage device 412 may store system programs, application programs, other program modules, and data, which have been described in greater detail herein. The mass storage device 412 may be connected to the computer 400 through a storage controller 414 connected to the chipset 404. The mass storage device 412 may consist of one or more physical storage units. The storage controller 414 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 400 may store data on the mass storage device 412 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 412 is characterized as primary or secondary storage, or the like.

For example, the computer 400 may store information to the mass storage device 412 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 may further read information from the mass storage device 412 by detecting the physical states or characteristics of one or more particular locations within the physical storage units.

In addition to the mass storage device 412 described above, the computer 400 might have access to other computer-readable media to store and retrieve information, such as program modules, data structures, or other data. It should be appreciated by those skilled in the art that computer-readable media can be any available media that may be accessed by the computer 400, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 412 may store an operating system 416 utilized to control the operation of the computer 400. In one configuration, the operating system comprises the LINUX operating system. In another configuration, the operating system comprises the WINDOWS® SERVER operating system from MICROSOFT Corporation of Redmond, Wash. In yet another configuration, the operating system may comprise the UNIX operating system. It should be appreciated that other operating systems may also be utilized. The mass storage device 412 may store other system or application programs and data utilized by the computer 400. For instance, the mass storage device may store the content selection module 104, which was described in detail above.

In one configuration, the mass storage device 412 or other computer-readable storage media is encoded with computer-executable instructions which, when loaded into the computer 400, transform the computer from a general-purpose computing system into a special-purpose computer capable of implementing the technologies described herein. These computer-executable instructions transform the computer 400 by specifying how the CPUs 402 transition between states, as described above. According to one configuration, the computer 400 has access to computer-readable storage media storing computer-executable instructions that, when executed by the computer, perform the various routines and operations described herein.

The computer 400 may also include an input/output controller 418 for receiving and processing input from a number of input devices, such as a keyboard, a mouse, a touchpad, a touch screen, an electronic stylus, or other type of input device. Similarly, the input/output controller 418 may provide output to a display device, such as a computer monitor, a flat-panel display, a digital projector, a printer, a plotter, or other type of output device. It will be appreciated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for optimized selection and delivery of content have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method for delivering a restricted quantity of electronic messages across a network to a user device, performed by one or more processors remote from the user device, comprising:

based at least in part on attributes associated with a user profile of a user, identifying, by a content planning server, a plurality of instances of candidate content as candidates for delivery to the user device in an electronic message, wherein the attributes comprise a history associated with the user profile of purchases previously made through a retail computer system;

computing, by the content planning server, an exploitation score for individual instances of candidate content, wherein the exploitation score comprises an estimate of feedback expected from the user device following delivery of a respective individual instance of the candidate content to the user device based on historical feedback received by the retail computer system from one or more other users;

computing, by the content planning server, an exploration score for the individual instances of candidate content;

computing, by the content planning server, a ranking score for the individual instances of candidate content based, at least in part, on the respective exploitation score and the exploration score for the individual instances of candidate content;

generating, by the content planning server, a ranking of the plurality of instances of candidate content based, at least in part, on the ranking scores for the plurality of instances of candidate content;

selecting, by the content planning server, one of the plurality of instances of candidate content for delivery to the user device based, at least in part, on the ranking of the plurality of instances of candidate content;

causing, by the content planning server, the one of the plurality of instances of candidate content to be transmitted in the electronic message across the network to the user device, the electronic message being one of the restricted quantity of electronic messages permitted to be sent to the user device in a particular period of time;

obtaining, by the retail computer system, feedback from the user device based upon the one of the plurality of instances of candidate content transmitted to the user device; and in response to the feedback being negative, dynamically penalizing the exploitation score in an amount that varies based at least in part on a volume of the purchases previously made by the user through the retail computer system.

2. The computer-implemented method of claim 1, wherein the exploration score comprises a value that varies inversely to a number of times the respective individual instance of the candidate content has been transmitted to user devices.

3. The computer-implemented method of claim 1, wherein the ranking score is computed by summing the exploitation score and the exploration score.

4. The computer-implemented method of claim 1, wherein the attributes further comprise an age, hobbies, and a geographic location of the user.

5. The computer-implemented method of claim 1, further comprising removing the one of the plurality of instances of candidate content transmitted to the user device from the candidates for delivery to the user device.

6. The computer-implemented method of claim 1, wherein the feedback comprises the retail computer system not receiving a positive response from the user within a predetermined period of time after the transmission of the electronic message to the user device.

7. The computer-implemented method of claim 1, wherein in response to the user making a purchase in response to the one of the plurality of instances of candidate content, updating the exploitation score to reflect positive feedback for the one of the plurality of instances of candidate content.

8. A non-transitory computer-readable storage medium having computer-executable instructions stored thereupon which, when executed by the computer, cause the computer to:

based at least in part on attributes associated with a user profile of a user, select a plurality of instances of candidate content as candidates for delivery to the user device in an electronic message, wherein the attributes comprise a history associated with the user profile of purchases previously made through a retail computer system;

compute distributions over possible values of an exploitation score for the plurality of instances of candidate content, wherein the exploitation score comprises an estimate of feedback expected from the user device following delivery of a respective instance of the candidate content to the user device based on historical feedback received by the retail computer system from one or more other users;

sample from the distributions for the plurality of instances of candidate content to obtain ranking scores for the plurality of instances of candidate content;

generate a ranking of individual instances of candidate content for the user profile based, at least in part, upon the ranking scores;

select at least one of the plurality of instances of candidate content for transmission to the user device based, at least in part, upon the ranking;

cause the at least one of the plurality of instances of candidate content to be transmitted in the electronic message across the network to the user device, the electronic message being one of a restricted quantity of electronic messages permitted to be sent to the user device in a particular period of time;

obtain, through the retail computer system, feedback from the user device based upon the at least one of the plurality of instances of candidate content transmitted to the user device; and in response to the feedback being negative, updating the distribution over the possible values to dynamically penalize the exploitation score in an amount that varies based at least in part on a volume of the purchases previously made by the user through the retail computer system.

9. The non-transitory computer-readable storage medium of claim 8, wherein the sampling of the distributions is performed using Thompson Sampling.

10. The non-transitory computer-readable storage medium of claim 8, wherein the at least one of the plurality of instances of candidate content is transmitted to the user device by way of one or more of an SMS message or a push notification.

11. The non-transitory computer-readable storage medium of claim 8, wherein the attributes further comprise an age, hobbies, and a geographic location of the user.

12. The non-transitory computer-readable storage medium of claim 8, wherein the instructions further cause the computer to remove the at least one of the plurality of instances of candidate content transmitted to the user device from the candidates for delivery to the user device.

13. The non-transitory computer-readable storage medium of claim 8, wherein the feedback comprises the retail computer system not receiving a positive response from the user within a predetermined period of time after the transmission of the electronic message to the user device.

14. The non-transitory computer-readable storage medium of claim 8, wherein in response to the user making a purchase in response to the at least one of the plurality of instances of candidate content, updating the exploitation score to reflect positive feedback for the at least one of the plurality of instances of candidate content.

15. An apparatus, comprising:
  at least one processor; and
  a non-transitory computer-readable storage medium having computer-executable instructions stored thereon which, when executed on the at least one processor, cause the apparatus to
    select, by a content planning server, one of a plurality of instances of candidate content for transmission to a user device in an electronic message based, at least in part, upon an exploitation score and an exploration score and on attributes associated with a user profile of a user, wherein the attributes comprise a history associated with the user profile of purchases previously made through a retail computer system, wherein the exploitation score comprises an estimate of feedback expected from the user device following delivery of the one of the plurality of instances of candidate content to the user device based on historical feedback received by the retail computer system from one or more other users;
    cause the one of the plurality of instances of candidate content to be transmitted in the electronic message across the network to the user device, the electronic message being one of a restricted quantity of electronic messages permitted to be sent to the user device in a particular period of time;
    obtain, by the retail computer system, feedback from the user device based upon the one of the plurality of instances of the candidate content transmitted to the user device; and
    in response to the feedback being negative, dynamically penalizing the exploitation score in an amount that varies based at least in part on a volume of the purchases previously made by the user through the retail computer system.

16. The apparatus of claim 15, wherein select one of a plurality of instances of candidate content for transmission to a user device in an electronic message based, at least in part, upon an exploitation score and an exploration score and on attributes associated with the user profile comprises:
  computing the exploitation score for individual instances of candidate content;
  computing the exploration score for the individual instances of candidate content;
  computing a ranking score for the individual instances of candidate content based, at least in part, on the respective exploitation score and the exploration score for the individual instances of candidate content;
  generating a ranking the plurality of instances of candidate content based, at least in part, on the computed ranking scores for the plurality of instances of candidate content; and
  selecting the one of the plurality of instances of candidate content for delivery to the user device based, at least in part, on the ranking.

17. The apparatus of claim 15, wherein the exploration score comprises a value that varies inversely to a number of times the one of the plurality of instances of the candidate content has been transmitted to user devices.

18. The apparatus of claim 15, wherein the attributes further comprise an age, hobbies, and a geographic location of the user.

19. The apparatus of claim 15, wherein the instructions further cause the apparatus to remove the one of the plurality of instances of candidate content transmitted to the user device from the candidates for delivery to the user device.

20. The apparatus of claim 15, wherein the feedback comprises the retail computer system not receiving a positive response from the user within a predetermined period of time after the transmission of the electronic message to the user device.

* * * * *